J. E. EMERSON.
Swage for Sharpening Saws.
No. 2,719. Reissued Aug. 6, 1867.
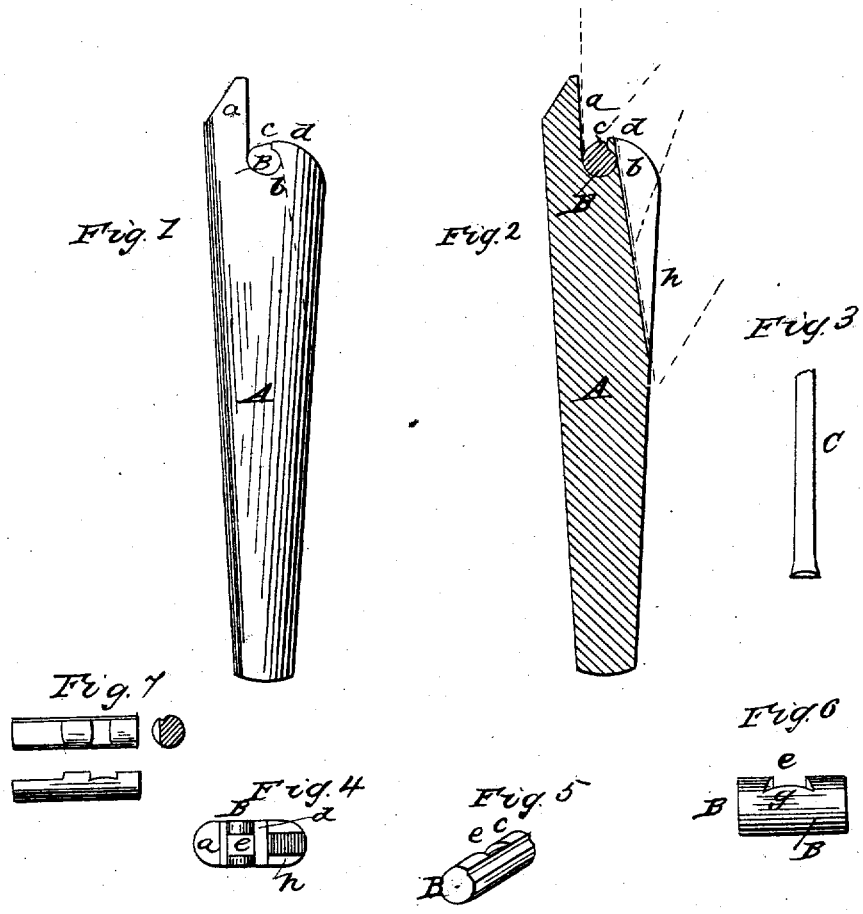
Witnesses
Alex A. C. Mauck
A. F. Call
Inventor
J. E. Emerson
N. PETERS, Photo-Lithographer, Washington, D. C.

United States Patent Office.

JAMES E. EMERSON, OF TRENTON, NEW JERSEY.

*Letters Patent No.* 55,262, *dated June* 5, 1866; *reissue No.* 2,719, *dated August* 6, 1867.

IMPROVED SWAGE FOR SHARPENING SAWS.

The Schedule referred to in these Letters Patent and making part of the same.

TO ALL WHOM IT MAY CONCERN:

Be it known that I, JAMES E. EMERSON, of Trenton, New Jersey, have invented a new and improved Swage for Sharpening Saw-Teeth; and I do hereby declare the following to be a full and exact description thereof, reference being had to the accompanying drawings, and to the letters of reference marked thereon.

Figure 1 is a side view of my invention.

Figure 2, a longitudinal central section of the same.

Figure 3, a front view of a saw-tooth sharpened by my implement.

Figure 4, an end view of my improved implement.

Figure 5, a detached perspective view of the die pertaining to the same.

Figure 6, a detached and enlarged front view of the die.

Similar letters of reference indicate like parts.

This invention relates to a new and improved swage for sharpening saw-teeth. The swages hitherto used for this purpose, so far as bringing the tooth to a proper cutting edge was concerned, answered quite well, but the difficulty attending their use consisted in their inability to give the edge of the tooth any required shape or proportion; for instance, the edge of some teeth would be made too broad, others too narrow, and many would not be of the proper form, and hence, after sharpening the teeth of a saw, they require to be dressed up or finished by filing.

My invention consists in providing the swage or implement with a die constructed in such a manner that while serving as a portion of the mould to bring the points of the teeth to a proper feather or sharp edge, will also serve to give a proper shape and size to the point or cutting edge of the tooth, so that all the teeth of a saw will correspond both in shape and dimensions.

A represents what may be termed the shank or body of my improved implement, which may be of steel throughout, and of slightly taper form, as shown in figs. 1 and 2. The large end of this shank is formed with an extended lip, *a*, one surface of which, the inner one, is a plane, and at the inner end of this lip in the shank there is made a recess, *b*, of circular form in its transverse section, to receive a cylindrical die, B, which is formed with a lip, *c*, to bear or rest against the end *d* of the shank, as shown clearly in figs. 1 and 2, together forming a mould in which the point of the tooth is shaped. This die is of steel, and it is formed with a recess, *e*, the sides of which are inclined, as shown at *f f* in fig. 6, and the bottom is slightly convex, as shown at *g*. This die is tempered extremely hard, as hard as may be, at the side in which the recess *e* is made, and the same may be said of the inner surface of the lip *a*. The die B is inserted in its recess *b* in the shank A in such a position that the recess *e* will have a proper relative position with the inner surface of the lip *a*, the bottom of *e*, and the inner surface of *a* forming the swage.

The implement is adjusted to the point of the tooth C, the latter being in the angle formed by the inner surface *a* and the bottom of the recess *e*, as shown in red in fig. 2, and the small end of the shank A is struck by a hammer, and the end of the tooth upset or swaged into the proper or desired form, the inner surface of the lip *a* giving the proper shape to the outer side of the tooth, the bottom of the recess *e* giving the proper shape to the bottom or under side of the tooth, the outer and under side of the latter being brought to a feather edge, while the sides *f f* of the recess *e* give the proper shape to the sides of the tooth. The tooth, it will be seen, cannot be spread laterally beyond the sides of the recess *e*, and hence all the teeth of a saw will be swaged to a corresponding size and shape, and will require no dressing up or finishing with a file. Different dies, having different-sized recesses *e*, may be used, as circumstances require, and *i* in fig. 7 shows a portion of a die intended to swage the tooth without regard to its spread laterally.

In order to insure uniformity and regularity in the projection in the cutting edge of the tooth, a guiding groove, *h*, shown in figs. 2 and 4, is formed in the under side of the shank of the punch A, which groove receives the outer edge of that tooth which next precedes the tooth to be dressed, so that the punch and its die will be always guided directly and perpendicularly to the edge of the tooth under treatment, and bear equally upon every part of its width, thus preventing any obliquity of the tooth, and preserving for the line of its cutting edge a direction at right angles with the plane of the saw. The groove *h* is also necessary, in swaging saws with small teeth, to allow the plate to pass therein, so that the points of the teeth can reach the proper place in the die.

It will be found expedient under certain circumstances to sharpen the tooth by successive operations. In this case a movable pin, having one or more dies (fig. 7) for progressive formation, is used in the swage, the dies first used merely forming the teeth to nearly the size necessary to fill the finishing dies and giving them uniformity of direction and thickness, when their cutting edge will be finished by shifting the pin in its position in the swage, using the die for that purpose.

I do not claim broadly the sharpening of saw teeth by means of a swage, for such implement has been used for that purpose, but I do claim—

1. Swaging the teeth of saws, and forming them into suitable shape and width, and bringing them to a proper feather or cutting edge at one operation by the combined operation of a die in or on the piece of steel, and a blow upon the swage, substantially in the manner and for the purpose set forth.

2. I claim the swage-stock or handle A and the pin B, when combined and used substantially in the manner and for the purpose set forth.

3. I claim the groove *h*, when used in combination with the swage, for the purpose of allowing the teeth of the saw to come up to the die, as herein set forth.

JAMES E. EMERSON.

Witnesses:
EDM. F. BROWN,
C. M. D. BROWN.